United States Patent [19]
Okamura

[11] Patent Number: 5,459,847
[45] Date of Patent: Oct. 17, 1995

[54] PROGRAM COUNTER MECHANISM HAVING SELECTOR FOR SELECTING UP-TO-DATE INSTRUCTION PREFETCH ADDRESS BASED UPON CARRY SIGNAL OF ADDER WHICH ADDS INSTRUCTION SIZE AND LSB PORTION OF ADDRESS REGISTER

[75] Inventor: Atsushi Okamura, Tokyo, Japan

[73] Assignee: NEC Corporation, Tokyo, Japan

[21] Appl. No.: 881,430

[22] Filed: May 11, 1992

[30] Foreign Application Priority Data

May 21, 1991 [JP] Japan ..................... 3-115162

[51] Int. Cl.⁶ ..................................... G06F 9/32
[52] U.S. Cl. ............. 395/421.03; 395/375; 364/DIG. 1; 364/247.2; 364/247.6; 364/255.1; 364/255.8
[58] Field of Search ..................... 395/375, 800

[56] References Cited

U.S. PATENT DOCUMENTS

| | | | |
|---|---|---|---|
| 4,500,959 | 2/1985 | Kubo et al. | 395/375 |
| 4,709,324 | 11/1987 | Kloker | 395/375 |
| 4,764,861 | 8/1988 | Shibuya | 395/375 |
| 4,860,197 | 8/1989 | Langendorf et al. | 395/375 |
| 4,926,323 | 5/1990 | Baror et al. | 395/375 |
| 4,984,154 | 1/1991 | Hanatani et al. | 395/375 |
| 5,168,557 | 12/1992 | Shibuya | 395/375 |
| 5,197,141 | 3/1993 | Ito | 395/425 |

*Primary Examiner*—Krisna Lim
*Attorney, Agent, or Firm*—Whitham, Curtis, Whitham & McGinn

[57] ABSTRACT

A program counter for a prefetch mechanism in a stored program arithmetic unit for generating an instruction address of an immediately succeeding instruction by using a portion of or the entire prefetch address and a current instruction address, includes a prefetch address generator and an instruction address generator. The prefetch address generator includes a first n-bit register storing a current prefetch address, an n-bit adder for obtaining a next prefetch address, and a first n-bit selector. The instruction address generator includes a second n-bit register storing a current instruction address, an m-bit adder, an (n-m)-bit selector and a second n-bit selector.

7 Claims, 3 Drawing Sheets

PROGRAM COUNTER MECHANISM HAVING SELECTOR FOR SELECTING UP-TO-DATE INSTRUCTION PREFETCH ADDRESS BASED UPON CARRY SIGNAL OF ADDER WHICH ADDS INSTRUCTION SIZE AND LSB PORTION OF ADDRESS REGISTER

BACKGROUND OF THE INVENTION

1. Field of the Invention

The present invention generally relates to a program counter for an instruction prefetch device in an arithmetic processor of stored program type and, more particularly, to a device for generating an instruction address for an instruction to be executed subsequently.

2. Description of the Prior Art

An arithmetic processor of stored program type performs arithmetic processes by storing instructions in a storage device, reading the instructions from the storage device and executing the instructions in sequence. A program counter is a mechanism which obtains, in the arithmetic processor of stored program type, an address of an instruction to be executed next by adding a size (typically in bytes) of an instruction which is currently being executed to an address of the instruction, without describing, during execution of the current instruction, the address of the instruction to be executed next. Further, a prefetch circuit is a mechanism for enabling effective use of an interface between an arithmetic processor and an external device. In the stored program type arithmetic processor having a program counter, since instructions are executed in ascending address, a prefetch of instruction is possible when there is no conflict in an interface between the arithmetic processor and an external device.

The arithmetic processor of stored program type takes instructions and data therein through the external interfaces. When there is only one set of the external interfaces, which includes an address bus and a data bus, a data access and an instruction access share the interfaces. Therefore, during data access, the external interfaces are occupied. As a result, an instruction fetch, which is a read-in cycle of the instruction utilizing the external interfaces, is impossible. Where the external interfaces are occupied, an execution of a pipelined staging of the instruction fetch becomes possible by prefetching.

Whereas the program counter is incremented every instruction by the number of bytes of the instruction, a prefetch counter is incremented by a data size which can be handled by the external interfaces at once. The instruction size depends upon the kind of instruction and is typically one byte, two bytes, three bytes or four bytes, etc., and the data size corresponds to a size of the external interface and is usually two or four bytes. Therefore, values by which the program counter and the prefetch counter are incremented are not always identical.

The prefetch mechanism usually has a first-in, first-out (FIFO) buffer register. The FIFO register operates to output data in the order in which the data was originally input to the register. The prefetch address is counted in ascending order to generate addresses of instructions written in the FIFO buffer register in sequence. A memory is referenced with the prefetch addresses, and successive regions thereof are read out to the FIFO buffer. The FIFO buffer register also has an instruction align mechanism in which a stream of instructions in the buffer is divided to instruction units which are sent to an execution unit. The prefetch mechanism reads in the FIFO buffer register as large a number of instructions as possible so long as the external interfaces can be utilized, until the buffer register becomes full. When the FIFO buffer register becomes full, the instruction read-in cycle from the external bus interfaces is terminated.

The instruction address is an address of an instruction sent to the execution unit from the FIFO buffer register and is generated by an instruction address generation mechanism. The instruction address generator generates a value which is a sum of a current instruction address and a size of an instruction transmitted from the buffer register to the execution unit. Therefore, it is usual that the prefetch address generator circuit and the instruction address generator circuit operate independently to create an address to be prefetched next and an address of an instruction to be executed next. To this end, an adder for the prefetch address and an adder for creation of the instruction address are required, each having the same address bit width. If the whole mechanism were to be constituted as an integrated circuit, the adders would occupy a large area thereof. It is therefore highly desirable to realize the same functions while minimizing the size of the integrated circuit in which the prefetch mechanism is implemented.

SUMMARY OF THE INVENTION

It is therefore an object of the present invention to provide, in a stored instruction type information processor having a prefetch circuit, a next instruction address on the basis of a current prefetch address and a current instruction address.

Another object of the present invention is to realize a mechanism for creating a next instruction address on the basis of a current prefetch address and a current instruction address while using a minimum number of circuit components.

According to the present invention, the program counter for the prefetch mechanism is constituted by a prefetch address generator circuit and an instruction address generator circuit. The prefetch address generator circuit includes a first n-bit register for storing a current prefetch address, an n-bit adder for obtaining a next prefetch address and an n-bit selector, where n is the number of bits of an instruction address. The instruction address generator circuit includes a second n-bit register for storing a current instruction address, an m-bit adder, an (n-m)-bit selector and a second n-bit selector, where m is a natural number larger than $\log_2 l$ and smaller than n and l is the maximum number of bytes capable of being stored in a prefetch buffer for the mechanism. Thus, it is possible to constitute the generator with components of smaller size compared with a conventional mechanism constituted with two adders each of m bits.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
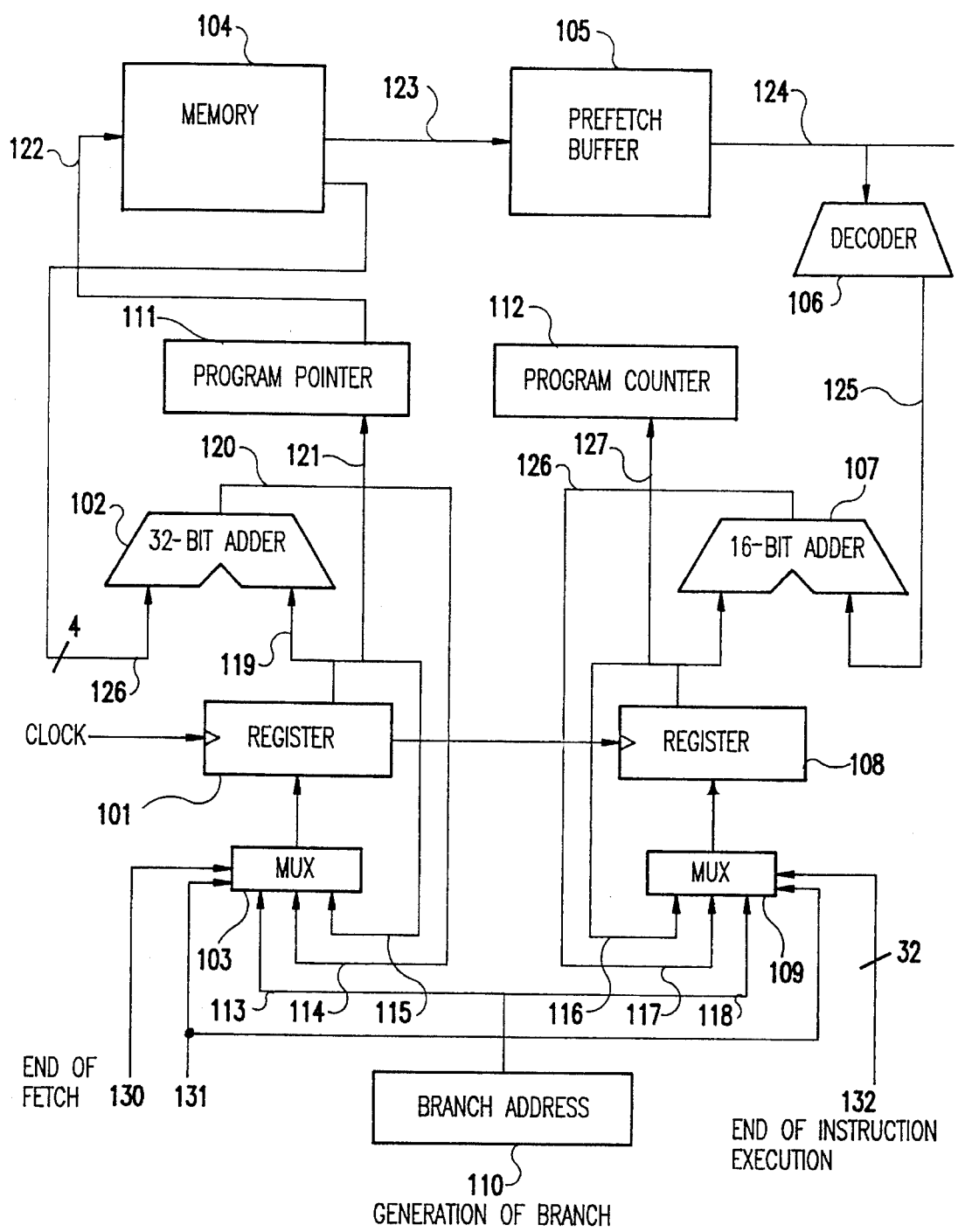
FIG. 1 is a block diagram showing a conventional prefetch mechanism.

Referring now to the drawings, and more particularly to FIG. 1, there is shown by way of example a conventional prefetch mechanism. In this example, the program counter circuit and a prefetch circuit each have a 32-bit address space. The prefetch mechanism is a circuit for prefetching an externally supplied instruction along a flow of the program being executed. The prefetch circuit is extremely effective when its size is different from that of an interface bus for external dam. Prefetch is executed when there is a space in the prefetch buffer. A next prefetch address is created by adding the bus size to a current prefetch address. The bus size is usually a multiple of eight, such as sixteen bits, thirty-two bits or sixty-four bits. That is, two, four or eight bytes are handled thereby at once.

In FIG. 1, a prefetch address is recorded in a register 101. The prefetch address is used to access a memory 104. When the access is successful, a signal indicative of the fetch size of the instruction and a signal indicative of the current prefetch address are sent to an adder 102 through signal lines 126 and 119, respectively. In order to make the sum the next fetch address, the sum output from adder 102 is written in the register 101 through a signal line 120 and a selector 103. Data prefetched from memory 104 is stored in a prefetch buffer 105.

Where the prefetch is started from a new address, such as in the case of a branch instruction, a branch address is set by updating it with a branch destination address through a signal line 113 and a selector 103. When the access is unsuccessful, the same value as in the preceding cycle is rewritten to the register 101 through a signal line 115.

Next, the circuit for creating the instruction address will be described. The updating procedure for the instruction address are as follows: A current value of the program counter 112 is recorded in a register 108. An instruction code whose address is stored in the register 108 is fetched from the prefetch buffer 105 and sent to the instruction execution unit (not shown). Alternatively, the instruction code may be taken in from memory 104 through the prefetch buffer 105. The data sent to the instruction execution unit is decoded in decoder 106 to determine the size of the instruction. The instruction size thus determined is output on signal line 125, and this value and the current program counter value, i.e., instruction address, are added by an adder 107 to create an instruction address of a next instruction. In order to make possible the setting of a new value in the program counter 112 according to other instructions controlling the flow of the program, such as a branch instruction, either an output of the adder 107 or a branch address is selected by a selector 109 as an input for the program counter register 112.

The bus size of the external interface 123 is thirty-two bits wide and one of the inputs 126 of the adder 102 is "+4". When a dynamic bus size is to be considered, the input 126 has a value of +1, +2 or +4. On the other hand, when the instruction is a variable byte length instruction whose size is one, two, three, four, or five bytes, the input on line 125 of the adder 107 has a value of +1, +2, +3, +4, . . . Since these values are not always coincident, an instruction fetch from the bus is performed at the prefetch address and an execution of the instruction is executed by using the instruction address. That is, the creation of the address is effectively doubled. Therefore, these mechanisms require two 32-bit adders or incrementers and two 32-bit data selectors.

In particular, when the instruction size is not the same as the external bus size, it is necessary to execute a prefetch with the bus size and to divide out a portion of the instruction whose size is unique thereto. Therefore, the prefetch address and the instruction address differ from each other, which are inevitable in prefetching and in executing the instruction. However, in an information processor having a prefetch mechanism, it is impossible to create a value by means of a single adder since a relation between a value of a program counter and a prefetch address cannot be determined easily although these values are very close. Therefore, an adder for the prefetch address and an adder for the program counter must be provided separately. In particular, if a whole mechanism were to be constituted as an integrated circuit, the adders would occupy a large area thereof. Therefore, the necessity of two separate adders, each thirty-two address bits wide, is a considerable defect. It may be possible to make the circuit small by using a single adder operating in time division. In such case, however, it is impossible to increase a whole clock frequency. It is therefore highly desired to realize the same functions while minimizing the size of the integrated circuit in which the prefetch mechanism is implemented.

Figure 2:
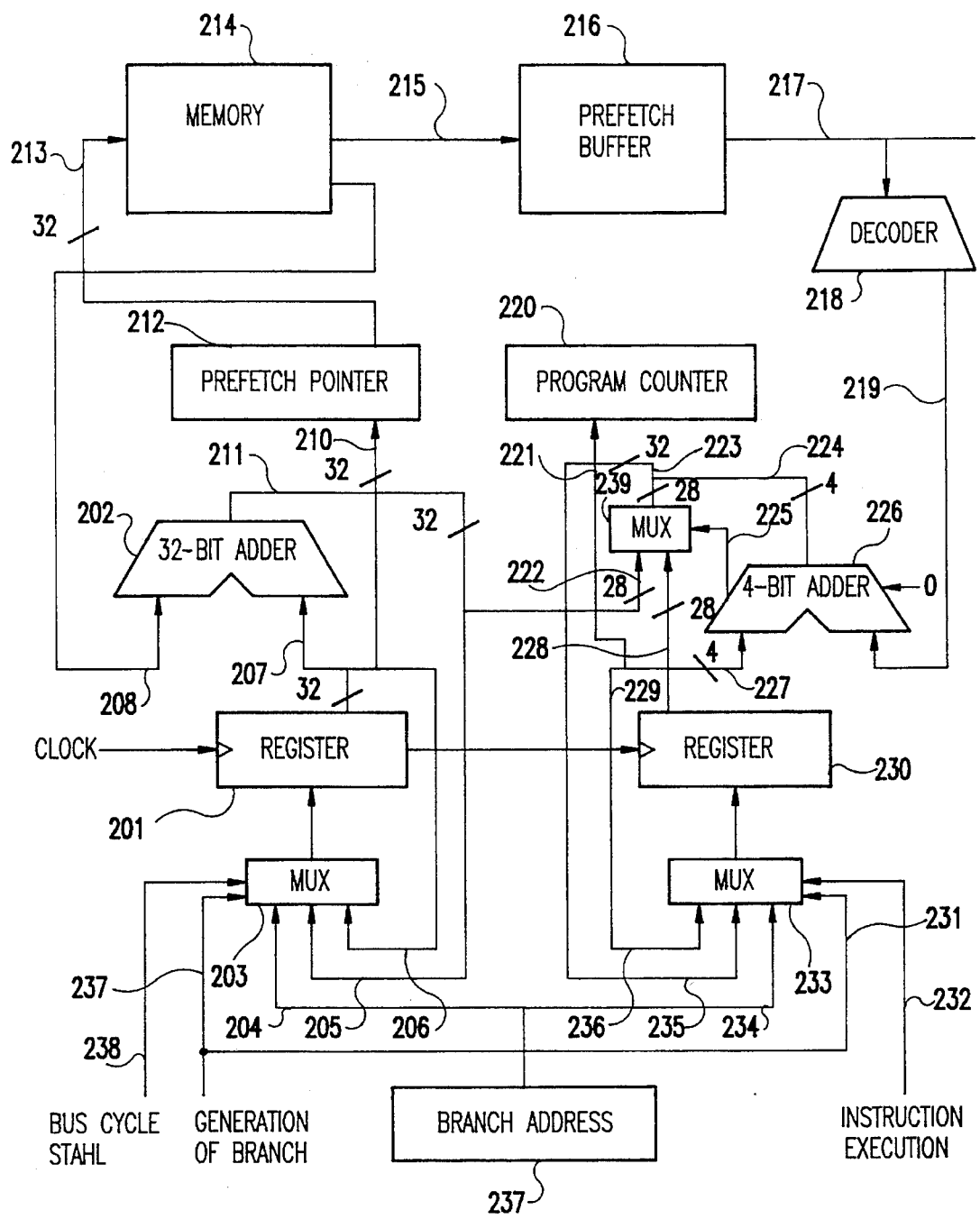
FIG. 2 is a block diagram showing a first embodiment of the prefetch mechanism according to the present invention.

FIG. 2 shows a first embodiment of the prefetch mechanism according to the invention. In FIG. 2, it is assumed that the address is thirty-two bits wide, the instruction type is one, two or four bytes, the prefetch buffer is sixteen bytes wide and the fetch size in a prefetching operation is thirty-two bits wide. A prefetch address is created by a 32-bit prefetch address register 201, a 32-bit adder 202 and a 32-bit selector 203 having three inputs and one output, similar to the conventional mechanism shown in FIG. 1.

The prefetch address register 201 stores a current prefetch address, and an instruction fetching is performed by using the prefetch address. The 32-bit prefetch address signal from the prefetch address register 201 is supplied to an address input of memory 214 through a signal line 210, a prefetch pointer or address bus buffer 212 and a 32-bit instruction address bus 213. The memory 214 is accessed with the prefetch address, and data therefrom is sent to prefetch buffer 216 through a data bus 215 and stored therein.

At this time, an output signal of the memory 214 which is indicative of the size of data on the bus 215, and is two or four bytes depending upon the fetch size, is supplied to one input of the adder 202 through a signal line 208. The purpose of inputting the fetch data size signal to the adder 202 is to calculate the next instruction fetch address for any of various fetch sizes indicated by this signal. If the fetch size is fixed, the adder 202 may be an incrementer capable of being incremented by a certain number.

The prefetch buffer 216 has a FIFO structure to buffer instructions taken in through the external interface bus 215. The FIFO buffer 216 aligns the instructions in sequential order and outputs them to an instruction bus 217. This instruction bus 217 is connected to the execution unit (not shown) to transfer the instructions thereto. The prefetch buffer 216 has a space sixteen bytes wide and functions to buffer successive prefetched instructions.

When prefetching of an instruction is performed, the prefetch address register 201 is updated with a next memory address supplied from the adder 202 through a 32-bit signal line 209 connected to one input of the 32-bit selector 203. The selector 203 selects one of its inputs according to control signals supplied through signal lines 237 and 238. The control signal on the line 237 becomes active when an instruction was fetched, and the control signal on the line 238 becomes active to set a branch address when a branch instruction is generated. Of course, when the control signals on the lines 237 and 238 are active simultaneously, the branch address setting has priority.

On the contrary, when instruction read cycle is not executed and there is no branch instruction, an output of the prefetch address register 201, i.e., a current prefetch address is fed back through a signal line 206 when the control signals on the signal lines 237 and 238 are active to maintain the prefetch address in the prefetch address register 201 as it is. That is, a memory access is performed to the same instruction address.

The instruction read cycle is executed when the external interface bus 215 and the prefetch buffer 216 have space. When this condition is not satisfied, neither prefetch nor update of the prefetch pointer 212 is performed.

Now, a portion for generating the instruction address will be described. This portion is a main feature of the present invention over the conventional device shown in FIG. 1.

A current instruction address has been stored in a current instruction address register or program counter 220. The program counter register 220 is a 32-bit edge triggered-type register which stores an address of an instruction currently outputted to a current instruction bus 217. A difference between the instruction address and the prefetch address is sixteen bytes at maximum. This is because the prefetch buffer 216 is sixteen bytes wide. Generation of an instruction address is based on the fact that its width is always not more than the prefetch buffer width. Under these conditions, the instruction address can be updated in the following manner.

First, the least significant four bits of the current instruction address register 230 and the current instruction size are considered. The current instruction is stored in the prefetch buffer 216 and outputted through the instruction bus 217. The instruction on the instruction bus 217 is decoded by a decoder 218 to determine the instruction size, i.e., one, two or four bytes. The thus determined instruction size on signal line 219 is supplied to one input of a 4-bit adder 226.

The instruction addresses register 230 is an 32-bit edge triggered-type register. An output of this register indicates an address of the current instruction. The least significant four bits of the output of this register become an input to the other input of the adder 226 through signal line 227. The 4-bit adder 226 adds the least significant four bits of the current instruction address to the instruction size from decoder 218 of the instruction indicated by the instruction address and outputs a 4-bit output and a carry output to signal lines 224 and 225, respectively.

The most significant twenty-eight bits of a value of the instruction address register 230 on a signal line 228 and the most significant twenty-eight bits of the prefetch address from the adder 202 are inputted to a 28-bit selector 239, one of which is selected by a carry output of the 4 -bit adder 226 on the signal line 225. A 32-bit signal on a signal line 223 is composed of the 28-bit output of the selector 239 as the most significant twenty-eight bits and a 4-bit output of the adder 226 as the least significant four bits.

The most significant twenty-eight bits of the 32-bit signal on the signal line 223 are produced in the following manner. When the carry signal of the 4-bit adder 226 on the signal line 225 is not generated, the most significant twenty-eight bits of the instruction address, 31, . . . , 4, are outputted as a next or new instruction address and, when the carry signal is generated, the most significant twenty-eight bits of the prefetch address register 201 are outputted to signal line 222 as a next instruction address.

An instruction address is updated after execution of the instruction. The 32-bit selector 233 operates to select one of the branch address on a signal line 234, the next instruction address on a signal line 235 and the current instruction address on a signal line 236 according to the control signals on signal lines 231 and 232. The control signal on the signal line 231 is the control signal on a signal line 238, which is used to control a setting of branch address in the program counter. When this signal is active, the program counter 220 is loaded with a new branch address.

The control signal on the signal line 232 becomes active when the current instruction is executed and a next instruction is being outputted. When this signal becomes active, the instructions have successive addresses. A value which is a sum of the address of the current instruction and the number of instruction bytes of the current instruction is read in the register 230 as a next instruction address through the signal line 235.

Finally, when no control signal is active, the program counter register 220 keeps the same value as in the preceding cycle. In such case, prefetch buffer 216 also continues to hold the same value (instruction). The next instruction address can be generated by the 28-bit selector 239 and the 4-bit adder 226 as described above. The circuit size of these circuit components is one-fourth that of a conventional adder thirty-two bits wide.

Figure 3:
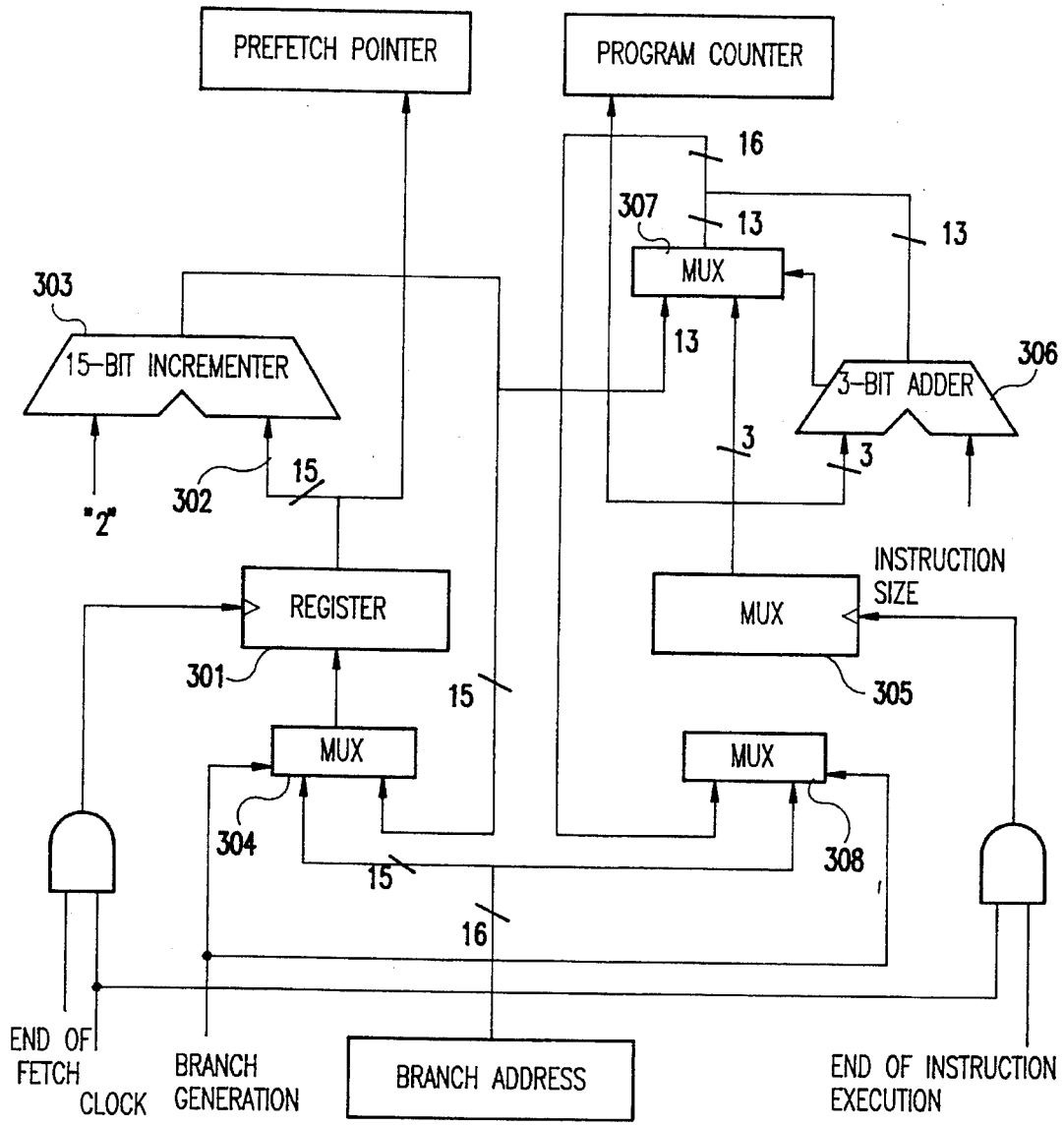
FIG. 3 is a block diagram showing a second embodiment of the prefetch mechanism according to the present invention.

FIG. 3 shows a second embodiment of the present invention where it is assumed that an address is sixteen bits wide and a data bus is sixteen bits wide. It is further assumed that an instruction size is one, two or four bytes and an external interface has a 16-bit address and a 16 -bit data path. The prefetch buffer can store four bytes of data.

The prefetch address generator shown in FIG. 3 includes a 15 -bit incrementer 303, a 15-bit selector 304 and a 15-bit register 301. The instruction address generator shown is constituted with a 16-bit register 305, a 13-bit selector 307, a 3-bit adder 306 and a 16-bit selector 305.

Since the external interface can handle data sixteen bits wide, a prefetch is performed every sixteen bits. That is, since the least significant bit of the address during prefetch is always "0" and the adder 303 always increments by "+1", the adder 303 may be an incrementer. The prefetch address includes fifteen bits, and a "0" is added to the least significant bit position thereof when it is outputted to the address bus.

A current prefetch address held in the register 301 is supplied through a 15-bit signal line 302 to an input of the incrementer 303. An output of the incrementer 303 and the most significant fifteen bits of a 16-bit branch destination address are inputted to the selector 304. When there is no branch instruction, the output of the incrementer 303 is selected and written in the register 301. Thus, the prefetch address is updated.

Since the instruction is one, two or four bytes which is not always aligned on 16-bit boundaries, the instruction address should be handled as having a width of sixteen bits. The register 305 is sixteen bits wide and holds a current instruction address. The most significant thirteen bits of the register 305 are connected to one input of the selector 307. A select input of the selector 307 is connected to a carry output of the adder 306. The other input of the register 307 is connected to the most significant thirteen bits of the output of the incrementer 303 of the prefetch address generation mechanism.

The least significant three bits of the output of the register 305 is added to an instruction size (1, 2, 4:3 bits) from the current instruction bus, resulting in the least significant three bits of a next instruction address. The most significant thirteen bits of the adder 306 are combined with an output of the selector 307 and inputted to one input of the selector 308. The selector 308 selects a branch address of the branch instruction when there is a branch instruction which is written in the register 305.

In the conventional mechanism illustrated in FIG. 1, a 32-bit incrementer and a 32-bit adder are required for prefetch of a variable length instruction having a 32-bit address and updating the program counter. Even in an arithmetic processor for a reduced instruction set (i.e., a so-called RISC processor) of fixed length instructions, two incrementers are required for creation of a prefetch address.

According to the present invention, the prefetch mechanism can be constituted with an adder, selectors, a prefetch buffer and a second, smaller adder which can be integrated within an area about 0.6 times an area required for the conventional mechanism. When the device is implemented in an integrated circuit, the number of parts required is much smaller compared with the conventional device. That is, area ratios of respective units on an integrated circuit to a 4-bit adder are sixteen for a 32-bit adder having carry prediction mechanism, one for a 4-bit adder, three for a 32-bit selector and two for a 28-bit selector, respectively. Thus, in the present invention, the area ratios are 3+2+ 1+16=22, while in the conventional device the area ratios are 3+ 16+16=35.

While the invention has been described in terms of two preferred embodiments, those skilled in the art will recognize that the invention can be practiced with modification within the spirit and scope of the appended claims.

What is claimed is:

1. A program counter for a prefetch mechanism in a stored program arithmetic unit for generating an instruction address of an immediately succeeding instruction by using a portion of or the entire prefetch address and a current instruction address, said prefetch mechanism including a decoder, said program counter comprising:

a prefetch address generator circuit including a first n-bit register storing a current prefetch address, an n-bit adder for obtaining a next prefetch address, and a first n-bit selector.
where n is a number of bits of an instruction address, an output of said first n-bit register being connected to a first input of said n-bit adder, a number of bytes fetched by a prefetch operation by said prefetch mechanism being supplied to a second input of said n-bit adder, an output of said n-bit adder being connected to a first input of said n-bit selector, and a branch destination address being supplied to a second input of said n-bit selector; and an instruction address generator circuit including a second n-bit register storing a current instruction address, an m-bit adder, an (n-m)-bit selector and a second n-bit selector,
where m is a natural number larger than $\log_2 l$ and smaller than n where l is the maximum number of bytes capable of being stored in a prefetch buffer of the prefetch mechanism, the most significant (n-m) bits of the output of said n-bit adder are supplied to a first input of said (n-m)-bit selector, the most significant (n-m) bits of an output of said second n-bit register are supplied to a second input of said (n-m)-bit selector,
the least significant m bits of the output of said second n-bit register are supplied to a first input of said m-bit adder, and a signal produced by said decoder decoding a current instruction and indicative of an instruction size is supplied to a second input of said m-bit adder, a carry output of said m-bit adder being used as a selection signal to said (n-m) selector, wherein said n-bit adder calculates a prefetch address of a next instruction, said first n-bit selector selects one of the output of said n-bit address and the branch destination address, an output of said first n-bit selector is written in said first n-bit register to thereby update the prefetch address, wherein a signal containing the output of said (n-m)-bit selector as the most significant bits and the output of said m-bit adder as the least significant bits is supplied to one input of said second n-bit selector, the output of said second n-bit selector is connected to an input of said second n-bit register.

2. The program counter recited in claim 1 wherein n is thirty-two, m is four and l is sixteen.

3. The program counter recited in claim 1 wherein n is sixteen, m is three and l is four.

4. The program counter recited in claim 1 wherein the least significant m-bits of said second n-bit register and the instruction size of an instruction stored at an address indicated by the current instruction address are added in said m-bit adder, said (n-m)-bit selector selecting the most significant (n-m) bits of said prefetch address in response to a carry bit output of said m-bit adder and the most significant (n-m) bits of the instruction address in the absence of a carry bit output of said m-bit adder, said second n-bit selector selecting either n-bits containing the most significant (n-m) bits from said output of said (n-m)-bit selector and the least significant m bits from the output of said m-bit adder or said branch destination address, a new instruction address being generated by writing the output of said second n-bit selector to said second n-bit register.

5. The program counter recited in claim 4 wherein n is thirty-two, m is four and l is sixteen.

6. The program counter recited in claim 4 wherein n is sixteen, m is three and l is four.

7. A processor comprising:

a memory for storing a string of instructions;

prefetch address generator means, operatively coupled to said memory, for generating a prefetch address and for accessing said memory by using said prefetch address to read out each of said instructions therefrom, said prefetch address having a predetermined number of bits including a portion of most significant bits;

a prefetch buffer, operatively coupled to said memory, for storing an instruction read out from said memory; and a program counter circuit for generating a current instruction address,
said program counter circuit including:
a register for temporarily storing said current instruction address and for issuing an output having a predetermined number of bits, said predetermined number of bits including a portion of most significant bits and a portion of least significant bits,
a decoder, operatively coupled to said prefetch buffer; for responding to a current instruction read out from said prefetch buffer and for generating a signal indicative of an instruction size of said current instruction, an adder, operatively coupled to said decoder and said register for adding said signal from said decoder and said portion of at least significant bits of said output of said register, said adder for producing an output and for selectively producing a carry signal, a selector operatively coupled to said adder and said register, for receiving said most significant bits of said output of said register and said most significant bits of said prefetch address generated by said prefetch address generator means and for outputting said most significant bits of said prefetch address when said adder produces said carry signal and for outputting said significant bits of said output of said register when said adder does not produce said carry signal, and means for supplying an output of said selector as most significant bits and said output of said adder as least significant bits to said register, to thereby update said current instruction address.

* * * * *